United States Patent [19]

Gliem et al.

[11] Patent Number: 4,529,532

[45] Date of Patent: Jul. 16, 1985

[54] PROCESS FOR THE PRODUCTION OF BINDER-FREE PRESS-MOLDED HEAT-INSULATING PARTS

[75] Inventors: Sabine Gliem, Frankfurt am Main; Peter Kleinschmit, Hanau; Rudolf Schwarz, Alzenau-Wasserlos, all of Fed. Rep. of Germany

[73] Assignee: Degussa Aktiengesellschaft, Frankfurt, Fed. Rep. of Germany

[21] Appl. No.: 579,913

[22] Filed: Feb. 13, 1984

[30] Foreign Application Priority Data

Feb. 17, 1983 [DE] Fed. Rep. of Germany ....... 3305375

[51] Int. Cl.³ .............................................. C04B 43/00
[52] U.S. Cl. ....................................... 252/62; 264/109
[58] Field of Search ...................... 252/62; 501/92, 97; 106/38.9; 264/109

[56] References Cited

U.S. PATENT DOCUMENTS

| 3,055,831 | 9/1962 | Barnetti | 252/62 |
| 3,468,992 | 9/1969 | LuBatti | 501/97 |
| 3,890,250 | 6/1975 | Richerson | 501/97 |
| 4,212,925 | 7/1980 | Kratel et al. | 252/62 |
| 4,221,672 | 9/1980 | McWilliams | 252/62 |
| 4,298,387 | 11/1981 | Kratel | 501/92 |

Primary Examiner—Theodore Morris
Attorney, Agent, or Firm—Beveridge, DeGrandi & Weilacher

[57] ABSTRACT

Binder-free mixtures of heat-insulating material are mixed with substances showing a basic reaction in aqueous solution during the mixing process and are then press-molded to press-molded heat-insulating parts.

10 Claims, 12 Drawing Figures

FIG. 1

FIG. 2 THERMAL CONDUCTIVITY AS A FUNCTION OF THE AVERAGE TEMPERATURE

FIG. 3 THERMAL CONDUCTIVITY AS A FUNCTION OF THE AVERAGE TEMPERATURE

FIG. 4 THERMAL CONDUCTIVITY AS A FUNCTION OF THE AVERAGE TEMPERATURE

FIG. 5 THERMAL CONDUCTIVITY AS A FUNCTION OF THE AVERAGE TEMPERATURE

FIG. 6 THERMAL CONDUCTIVITY AS A FUNCTION OF THE AVERAGE TEMPERATURE

FIG. 7 THERMAL CONDUCTIVITY AS A FUNCTION OF THE AVERAGE TEMPERATURE

FIG. 8

FIG.10 THERMAL CONDUCTIVITY AS A FUNCTION OF THE AVERAGE TEMPERATURE

STRONG SHRINKAGE AT HIGH TEMPERATURES

FIG.11 THERMAL CONDUCTIVITY AS A FUNCTION OF THE AVERAGE TEMPERATURE

FIG. 12 ABSOLUTE THERMAL CONDUCTIVITY IN DEPENDENCE ON THE AVERAGE TEMPERATURE

PROCESS FOR THE PRODUCTION OF BINDER-FREE PRESS-MOLDED HEAT-INSULATING PARTS

The invention relates to a process for the production of binder-free press-molded heat-insulating parts from a mixture of highly dispersed silicas, opacifiers, and inorganic fibers.

Press-molded heat-insulating parts are known, for example, from U.S. Pat. No. 3,055,831, German Provisional Patent No. 1,671,186, German OLS No. 2,754,956, and German OLS No. 2,524,096. Although these press-molded heat-insulating parts are characterized by their outstanding insulating action and temperature stability, their mechanical strength in some areas of use does not meet the requirements of machinability. These press-molded heat-insulating parts, in that case, require an additional reinforcement or mechanical stabilization.

Thus, it is known from German Provisional Patent No. 2,036,124 to charge particulate insulating materials based on silica aerogel into a porous sheath of flat fibrous tissue of low permeability. The filled sheath is formed into a sheet in a molding press with pressure build-up within the sheath, during which air is forced out of the sheath, the insulating material is compacted and reinforced, and the particles of the insulating material are bonded to each other and to the sheath. However, the press-molded heat-insulating parts produced in this manner, because of the textile covering, do not meet the requirements of machinability in some areas of use. They can be cut to size at the place of installation only with special tools, during which process the core material of the insulating material crumbles out of the sheath or falls out completely from the outer sheath. Furthermore, only the production of heat-insulating sheets and not that of complex press-molded heat-insulating parts is possible with this convering.

According to U.S. Pat. No. 3,055,831, handleable press-molded heat-insulating sheets of highly dispersed heat-insulating material, mixed with mineral fiber wool and opacifiers in a very fine form, are known. In the production of the known heat-insulating sheets, a binder is added to the mixture with mixing, which is then cured by heat or by catalytic reaction. The particles of the binder, in this case, must have a particle size similar to that of the particles of the insulating agent, so that their particle size must be below 0.1 micron. The mixing-in of the binders involves considerable difficulties, because both the fine-grained binder particles and also the particles of heat-insulating agent immediately aggregate to secondary agglomerates during mixing, and an effective blending of the binder and heat-insulating material is thus prevented. A non-uniformly distributed mixture of binder and heat-insulating material is produced. As a result, the mechanical properties of the finished press-molded parts are disadvantageously affected. Because only specific heat-insulating material composites are held together by the binder agglomerate, the product formed by the curing process tends to break.

From German OLS No. 2,748,307, a heat-insulating sheet is known whose core consists of a mixture of pyrogenic silica, opacifiers, and optionally mineral fibers and which contains a layer of mineral fibers with fillers and inorganic binder as a covering for this core. The relatively coarse-grained fillers of the outer layer are cured with water glass as a binder. However, this type of binder treatment leads to only a limited protection of the core of the heat-insulating material, since the relatively coarse surface layer is not abrasion-resistant even in the cured state and the mechanical strength of the press-molded heat-insulating parts is thus not increased to the expected extent by the curing.

Heat-insulating materials cured by homogeneous or inhomogeneous mixing of a binder into the heat-insulating material and subsequent thermal treatment are known from European Pat. No. 48,947 A 1 and German OLS No. 2,942,087.

In the known press-molded heat-insulating bodies, press-molded heat-insulating bodies press-molded from inorganic, highly dispersed heat-insulating material without a binder show the best heat-insulating properties, corresponding to the quality of the heat-insulating material. Binder-free press-molded heat-insulating bodies show a disadvantageous excessive volume expansion after the molding operation. They become cracked and the mechanical stability is reduced. In addition, the manufacture of complexly shaped, dimensionally accurate press-molded heat-insulating parts is extremely difficult, because of the poor dimensional stability.

It is the task of the invention to develop a press-molded heat-insulating part with improved mechanical properties and processing properties which withstands the stresses of higher temperatures and, in addition, shows heat-insulating properties comparable to those of binder-free heat-insulating materials.

The object of the invention is a process for the production of binder-free press-molded heat-insulating parts with the use of highly dispersed oxides of metals and/or metalloids, opacifiers, and inorganic fibers as a heat-insulating material, which is characterized by the fact that the highly dipsersed oxide of metals and/or metalloids, opacifiers, and inorganic fibers are mixed in the presence of nitrogen-containing substances showing a basic reaction in aqueous solution and this mixture of heat-insulating material is then press-molded. In a preferred embodiment of the invention, the nitrogen-containing substance can be used in the form of an aqueous solution.

As heat-insulating material within the scope of the invention one uses mixtures containing approximately 40 to 70 wgt % of highly dispersed oxides of metals and/or metalloids such as highly dispersed silica, such as, for example, pyrogenically produced silica, and a mixed oxide with aluminum oxide, titanium dioxide, and zirconium oxide or alkali-free precipitated silica, 20 to 50% of opacifier, e.g., quartz powder, rutile, or ilmenite, and 1 to 10 wgt % of a refractory fiber, such as aluminum silica, to increase the stability.

The nitrogen-containing substances showing a basic reaction in aqueous solution can be added to the mixture of heat-insulating material in gas form, e.g., ammonia gas. It may be of advantage if, in this case, the mixture of heat-insulating material contains moisture absorbed from the air. In an embodiment of the invention, the nitrogen-containing substances with a basic reaction, such as, for example, the ammonia gas, can be used mixed with water vapor.

It is important, however, that the addition of the nitrogen-containing substance with a basic reaction in aqueous solution takes place before the press-molding.

If, for example, gaseous ammonia is added to the press-molded heat-insulating part after the press-molding, then the extent of expansion is not improved, because this has already been completed. Only the flexural strength can be increased.

Water containing one or more compounds with a basic reaction, such as, for example, ammonia, ammonium carbonate, urea, or water-soluble amines can be added to the heat-insulating material during the mixing process.

If urea or ammonium carbonate is used as nitrogen-containing compound, then an after-annealing after the press-molding of the press-molded heat-insulating body at temperatures of 100° to 150° C. may be meaningful.

Although other compounds with a basic reaction, such as, for example, potassium hydroxide, sodium hydroxide, alkali water glass, etc. also lead to the desired improvements of the mechanical stability properties and to improvements of the processing properties, the quality of the heat-insulating material is considerably reduced by a reduced temperature stability and insulating action.

A good wetting of the heat-insulating material during mixing can be achieved if 3 to 7 wgt %, based on the total mixture of heat-insulating material, of aqueous solution containing compounds with a basic reaction at any concentration, but preferably at the highest possible concentration, is incorporated with uniform distribution into the mixture of heat-insulating material. Since most of the incorporated water must be dried off again, the lowest possible amount of water is used for economic reasons. The required quantity depends to a certain extent on the nature of the incorporation. The uniform distribution of the solution containing compounds with a basic reaction in the mixture of heat-insulating material can be carried out by spraying into the mixture of heat-insulating material, which is subjected to a mixing movement, at temperatures of between 20° and 100° C., preferably at 40° to 50° C. It has also been found advantageous to carry out the incorporation of the water containing compounds with a basic reaction at moderately elevated temperatures. This can be carried out by preheating either the liquid to be incorporated or the mixture of heat-insulating material or both components. The conversion can also be promoted by brief heating of the sprayed heat-insulating material in a closed space under autogenous pressure.

According to the invention, the drying of the press-molded heat-insulating parts obtained by press-molding of the mixture of heat-insulating material can also be carried out at room temperature.

If a drying of the mixture of heat-insulating material is carried out before the press-molding and before the addition of, for example, gaseous ammonia, then the desired effect of expansion reduction does not take place.

The improvement of the mechanical stability is obtained during the press-molding process. The compressive and flexural strength of the press-molded heat-insulating parts is considerably improved. The untreated known press-molded heat-insulating parts show an expansion of the volume after the molding process. The mixtures of heat-insulating material treated according to the invention do not show any expansion, or only a slight expansion as compared with the state of the art, of the press-molded heat-insulating parts after the molding process.

A significant advantage in this case is the fact that the press-molded heat-insulating parts produced according to the invention show a reproducibly adjustable expansion.

On the basis of the good dimensional stability, it now suggests itself to produce press-molded heat-insulating parts of complex shape with embossing by the use of an appropriate force plug by compaction or press-molding. The heat-insulating action and temperature stability of the press-molded heat-insulating parts according to the invention is reduced to a negligible extent. In the case of corresponding press-molded heat-insulating parts according to the state of the art, no reproducibility is obtained.

EXAMPLES

An important criterion for evaluating the quality of the press-molded heat-insulating parts is the expansion of the press-molded heat-insulating parts after the molding process, the mechanical stability (flexural strength), the thermal conductivity, and the thermal non-deformability.

Figure 1:
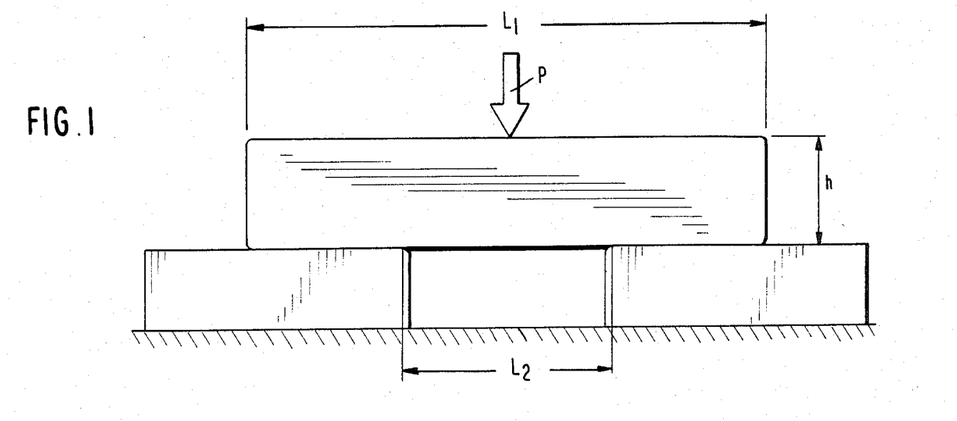

The testing is carried out on circular heat-insulating sheets with the dimensions diameter 100×20 mm. The heat-insulating sheets are subjected to the following test methods:

1. Thermal conductivity measurement in W/m. °C. (watt per meter. °Celsius).
2. Shrinkage of the diameter of the heat-insulating sheet in % at 1000° C. and a holding time of 10 hours.
3. Relative flexural strength in newton, for which the heat-insulating sheets are supported as beams on two supports and are loaded with the concentrated load P at the center. In this case, as shown in FIG. 1:

P=concentrated load in newton (compare the table)
$L_1$=specimen length of 100 mm
h=specimen height of 20 mm
$L_2$=support span of 40 mm.

The specimen is steadily bent by a uniform increase in the load. In the examples, an advance of the concentrated load of 5 mm/min is selected. The relative values for the loading capacity for the corresponding specimens are given in newtons.

COMPARISON EXAMPLES A

A homogenous mixture of heat-insulating material with a total weight of 300 g is prepared in a high-speed mixer (approximately 5000 rpm) from 63 wgt % of a pyrogenic silica with a BET surface area of 300 m²/g, 30 wgt % of a finely divided opacifier (rutile), and 7 wgt % of a ceramic fiber based on aluminum silicate (60 wgt % $Al_2O_3$ component). The mixture of heat-insulating material is press-molded into sheets with a liter weight of 300 g/L and is used as a comparison for Examples 1 to 4.

EXAMPLE 1

300 g of a mixture of heat-insulating material according to Comparison Example A is sprayed with an additional 15 g of water during the mixing process. The preparation, composition, and further processing of the insulating-material mixture is carried out as described in Comparison Example A. Although the expansion of the sheets after the molding process (10 minutes) is slightly reduced as compared with Comparison Example A, no distinct improvement in the flexural strength is achieved.

EXAMPLES 2 TO 4

300 g in each case of a mixture of heat-insulating material is sprayed with 15 g in each case of 5, 15, and 25% aqueous ammonia solution during the mixing process and sheets with a liter weight of 300 g are produced. The expansion of the sheets after the molding process (10 mins.) was significantly reduced, with a simultaneous improvement in the bending strength, negligible change in the insulating action, and retention of the thermal stability.

tionally sprayed with 5 g of 25% ammonia solution during the mixing process. The quantities of aqueous ammonia solution to be applied are so small, in comparison with the total mixture, that no homogenous mixing is obtained. An examination of the expansion behavior and of the flexural strength produces different results.

TABLE 1

| Example | Treatment | content % in solution | A 300 | Pressure bar/cm² 10 Min. | Expansion % | Flexural N | Standard | Shrinkage (%) 1000° d | h | V |
|---|---|---|---|---|---|---|---|---|---|---|
| 63% A 300 | None | — | | 14.5 | 9.5 | 110 | 114.3 ± 8 6 | 3.5% | 8.5% | 14.75% |
| 30% Rutile | | | | 14.5 | 9.2 | 121 | 100% | | | |
| 7% Kaowool | | | | 14.5 | 10.2 | 102 | | | | |
| (300 g) | | | | 14.5 | 9.2 | 123 | | | | |
| A | | | | 14.5 | 9.7 | 114 | | | | |
| 63% A 300 | mixture is | — | | 13 | 7.9 | 114 | 124.0 ± 11.0 | 3.5% | 9.1% | 15.5% |
| 30% Rutil | sprayed with | | | 13 | 6.3 | 141 | 109% | | | |
| 7% Kaowool | 15 g | | | 13 | 7.9 | 123 | | | | |
| (300 g) 1 | water | | | 13 | 7.3 | 124 | | | | |
| | | | | 13 | 7.9 | 115 | | | | |
| 63% A 300 | sprayed with | 5 | 0.4 | 11 | 2.5 | 153.1 | 162.3 ± 13.1 | 3.6% | 9.4% | 15.8% |
| 30% Rutile | 15 g aq. | | | 11 | 2.5 | 162.9 | 142% | | | |
| 7% Kaowool | ammonia | | | 11 | 2.5 | 157.8 | | | | |
| (300 g) 2 | | | | 11 | 2.5 | 153.3 | | | | |
| | | | | 11 | 2.5 | 184.6 | | | | |
| 63% A 300 | sprayed with | 15 | 1.2 | 11 | 2.5 | 159 | 161.2 ± 11.2 | 3.5% | 8.4% | 14.7% |
| 30% Rutile | 15 g aq. | | | 11 | 2.5 | 167 | 141% | | | |
| 7% Kaowool | ammonia | | | 11 | 2.5 | 159 | | | | |
| (300 g)3 | | | | 11 | 2.5 | 145 | | | | |
| | | | | 11 | 2.5 | 175 | | | | |
| 63% A 300 | sprayed with | 25 | 2.0 | 11 | 2 | 194 | 170.9 ± 17.0 | 3.4% | 7.8% | 14% |
| 30% Rutile | 15 g aq. | | | 11 | 2 | 178 | 150% | | | |
| 7% Kaowool | ammonia | | | 11 | 2 | 173 | | | | |
| (300 g)4 | | | | 11 | 2 | 160 | | | | |
| | | | | 11 | 2 | 150 | | | | |
| Bsp. 5 | 10 g** | 25 | 1.3 | 11 | 2.5 | 157 | 159.8 ± 6.1 | 3.2% | 7.9% | 14.0% |
| | | | | 11 | 2.5 | 163 | 2140% | | | |
| | | | | 11 | 2.5 | 159 | | | | |
| | | | | 11 | 2.5 | 152 | | | | |
| | | | | 11 | 2.5 | 168 | | | | |
| Bsp. 6 | 5 g** | 0.5 | 0.65 | 11 | 5.0 | 142 | | | | |
| | | | | 11 | 3.0 | 161 | | | | |
| | | | | 11 | 5.0 | 140 | | | | |
| | | | | 11 | 4.0 | 158 | | | | |
| | | | | 11 | 3.0 | 171 | | | | |

*The different pressures are utilized to produce heat-insulating sheets with a density of 300 g/l so that results can be compared.
**Sprayed with indicated amount of NH₃ solution The measured results of Comparison Example A and of Examples 1 through 4 are shown in Table 1. According to Table 1, for example, the flexural strength is improved by 50% by the use of 15 g of 25% NH₃ solution. The shrinkage does not show any deterioration, i.e., these mixtures can be used up to a temperature of 950° C.

Table 2 shows the thermal conductivities as a function of the average temperatures for Comparison Example A and Examples 2 to 4. The press-molded heat-insulating parts obtained according to the invention do not show any cracks or spaces, because the expansion is very small.

EXAMPLE 5

300 g of a mixture of heat-insulating material according to Comparison Example A is prepared and is additionally sprayed with 5 g or 10 g of 25% ammonia solution during the mixing process. The expansion of the sheets after the molding process is only 2.5%. The flexural strength was increased by approximately 40%, with a simultaneous retention of the insulating action and thermal stability.

EXAMPLE 6

300 g of a mixture of heat-insulating material according to Comparison Example A is prepared and is addi-

TABLE 2

| Outer Temp. °C. | Inner Temp. °C. | Average °C. | W/K | W/M*K | HHMMSS |
|---|---|---|---|---|---|
| Thermal conductivity in range 20°-1000° C. of comparison mixture A. | | | | | |
| 22 | 78 | 50 | 0208 | 0277 | 003729 |
| 22 | 209 | 115 | 018 | 024 | 002808 |
| 23 | 306 | 165 | 0176 | 0235 | 002254 |
| 25 | 402 | 214 | 0171 | 0229 | 002141 |
| 26 | 499 | 263 | 0169 | 0225 | 002114 |
| 28 | 595 | 311 | 017 | 0227 | 002103 |
| 31 | 689 | 360 | 0178 | 0237 | 002611 |
| 34 | 788 | 411 | 0191 | 0255 | 002530 |
| 37 | 887 | 462 | 0203 | 027 | 001959 |
| 41 | 983 | 512 | 0219 | 0292 | 002535 |
| 45 | 913 | 479 | 0203 | 0271 | 004031 |
| 46 | 812 | 429 | 0176 | 0235 | 002503 |
| 45 | 721 | 383 | 0173 | 0231 | 034743 |
| 43 | 616 | 330 | 016 | 0213 | 003453 |
| 41 | 518 | 280 | 0148 | 0198 | 003942 |
| 37 | 420 | 229 | 0139 | 0186 | 004850 |
| 33 | 322 | 178 | 013 | 0174 | 010348 |
| 28 | 233 | 120 | 0138 | 0184 | 020050 |
| 24 | 80 | 57 | 0135 | 018 | 033918 |

Figure 2:
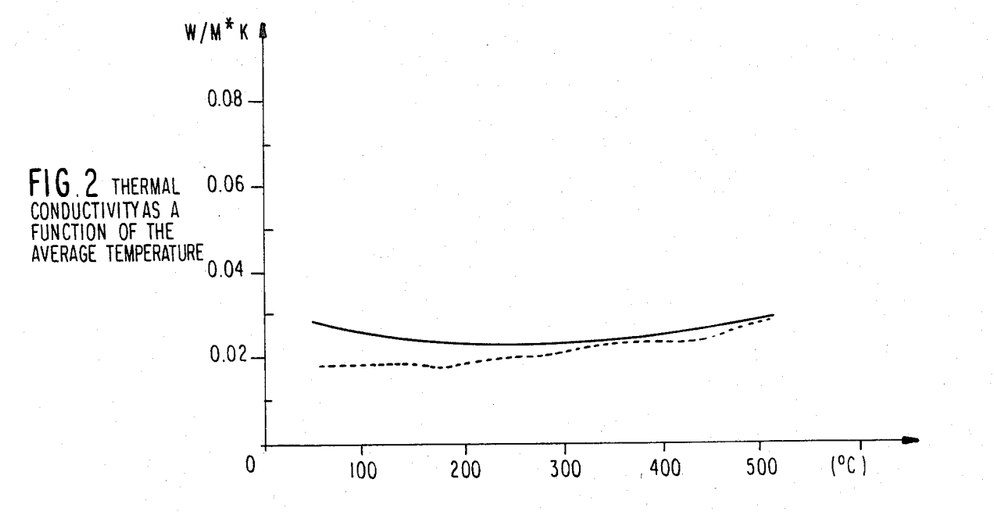

The graphic representation of these values is in FIG. 2.
Thermal Conductivity in the range 20°-1000° C. of Example 2
(sprayed with 5% Ammonia solution)

TABLE 2-continued

| Outer Temp. °C. | Inner Temp. °C. | Average °C. | W/K | W/M*K | HHMMSS |
|---|---|---|---|---|---|
| 20 | 74 | 47 | 035 | 0467 | 001035 |
| 20 | 211 | 116 | 0263 | 0351 | 001701 |
| 22 | 308 | 165 | 0236 | 0315 | 001250 |
| 25 | 407 | 216 | 0201 | 0268 | 003356 |
| 70 | 499 | 285 | 0218 | 029 | 001902 |
| 36 | 606 | 321 | 0194 | 0258 | 003013 |
| 42 | 688 | 365 | 0200 | 0277 | 010817 |
| 43 | 791 | 417 | 0221 | 0295 | 001841 |
| 46 | 887 | 466 | 0232 | 031 | 001851 |
| 49 | 981 | 515 | 0248 | 0331 | 002435 |
| 52 | 904 | 478 | 0231 | 0309 | 003605 |
| 53 | 811 | 432 | 0206 | 0275 | 002629 |
| 54 | 711 | 382 | 0192 | 0256 | 003537 |
| 50 | 612 | 331 | 0184 | 0245 | 004435 |
| 46 | 519 | 283 | 0177 | 0236 | 003417 |
| 43 | 421 | 232 | 0167 | 0223 | 004359 |
| 37 | 325 | 181 | 0169 | 0225 | 010242 |
| 31 | 226 | 129 | 0158 | 0211 | 012346 |
| 23 | 89 | 56 | 0134 | 0179 | 031502 |
| 20 | 91 | 56 | 0227 | 0371 | 001334 |
| 21 | 212 | 117 | 0199 | 0266 | 003735 |
| 23 | 305 | 164 | 0195 | 0261 | 002117 |
| 25 | 401 | 213 | 0194 | 0259 | 002044 |
| 27 | 496 | 262 | 0195 | 0261 | 002500 |
| 30 | 593 | 312 | 0203 | 0271 | 002454 |
| 33 | 692 | 362 | 0209 | 0279 | 001902 |
| 37 | 786 | 411 | 0218 | 0291 | 002405 |
| 42 | 884 | 463 | 0233 | 0311 | 002425 |
| 47 | 982 | 515 | 0252 | 0336 | 002422 |
| 52 | 984 | 478 | 0228 | 0304 | 003102 |
| 54 | 806 | 430 | 0219 | 0292 | 004122 |
| 54 | 714 | 384 | 0196 | 0261 | 002355 |
| 52 | 614 | 333 | 0189 | 0252 | 003942 |
| 49 | 517 | 283 | 0174 | 0232 | 003935 |
| 44 | 419 | 231 | 0169 | 0226 | 005301 |
| 41 | 323 | 182 | 0156 | 0200 | 005546 |
| 34 | 225 | 129 | 0141 | 0188 | 012003 |
| 24 | 98 | 57 | 0153 | 0204 | 032307 |

Figure 3:
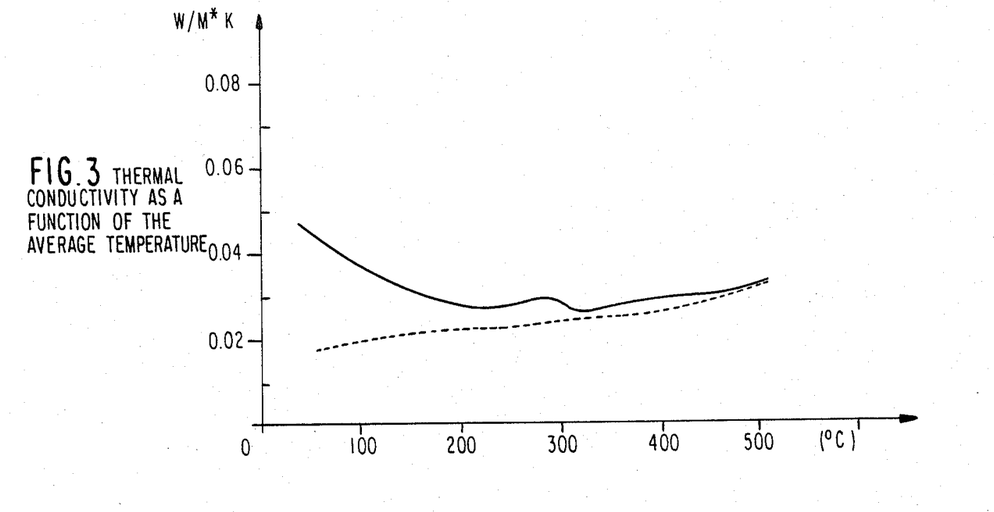
Figure 4:
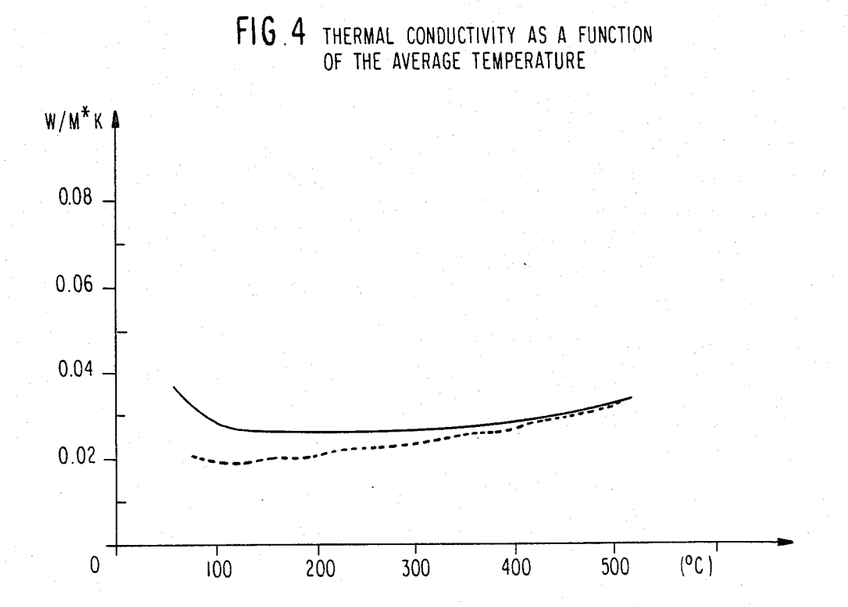

The graphic representation of these values is in FIG. 3.
Thermal Conductivity in the range 20° to 10000° C.
of Example 4
(with 25% Ammonia solution spray)

| Outer Temp. °C. | Inner Temp. °C. | Average °C. | W/K | W/M*K | HHMMSS |
|---|---|---|---|---|---|
| 24 | 79 | 51 | 0186 | 0248 | 004001 |
| 24 | 207 | 115 | 0174 | 0232 | 002947 |
| 25 | 304 | 164 | 0171 | 0228 | 002321 |
| 27 | 400 | 213 | 018 | 024 | 002736 |
| 29 | 498 | 264 | 0188 | 0251 | 002022 |
| 31 | 596 | 313 | 0196 | 0262 | 001935 |
| 33 | 693 | 363 | 0209 | 0278 | 002412 |
| 36 | 791 | 413 | 022 | 0293 | 001834 |
| 39 | 887 | 463 | 0231 | 0308 | 001848 |
| 44 | 983 | 513 | 0247 | 0329 | 002425 |
| 47 | 909 | 478 | 0216 | 0288 | 002117 |
| 49 | 813 | 431 | 0201 | 0269 | 002222 |
| 49 | 813 | 381 | 0181 | 0242 | 002633 |
| 46 | 611 | 328 | 0179 | 0239 | 004540 |
| 42 | 516 | 279 | 0166 | 0221 | 004439 |
| 38 | 418 | 228 | 016 | 0213 | 005318 |
| 34 | 322 | 178 | 0138 | 0184 | 005726 |
| 29 | 223 | 126 | 0139 | 0186 | 012912 |
| 23 | 89 | 56 | 0116 | 0154 | 031023 |

Figure 5:
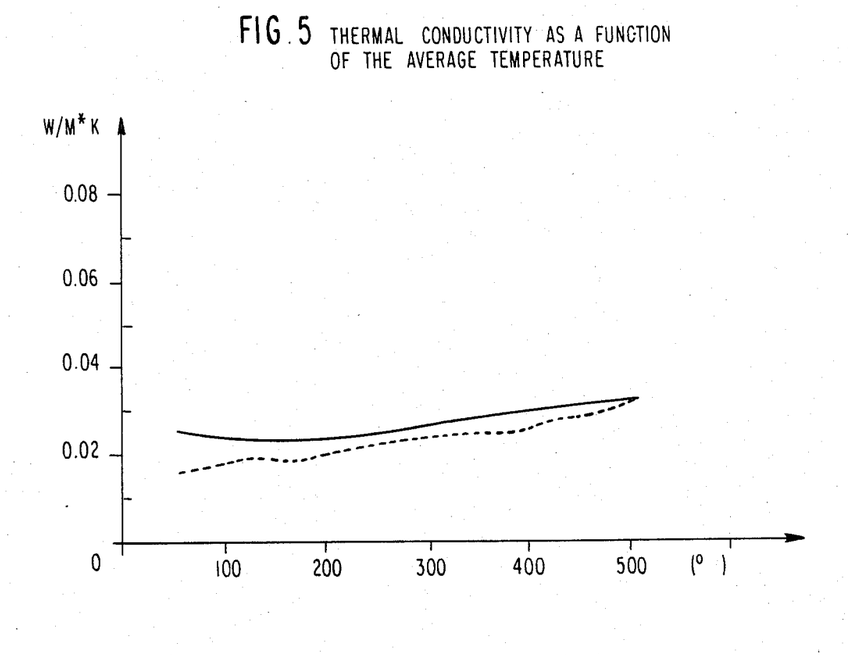

FIG. 5 shows the graphic representation of these values.
Thermal conductivity in the range 20 to 1000° C. of comparison
Example A
(sprayed with 10 g 25% Ammonia solution)

| Outer Temp. °C. | Inner Temp. °C. | Average °C. | W/K | W/M*K | HHMMSS |
|---|---|---|---|---|---|
| 22 | 81 | 52 | 0176 | 0235 | 004218 |
| 23 | 210 | 116 | 0161 | 0215 | 003035 |
| 25 | 306 | 165 | 0165 | 0221 | 002923 |
| 26 | 403 | 215 | 0168 | 0224 | 002250 |
| 28 | 497 | 263 | 0174 | 0232 | 002715 |
| 31 | 594 | 313 | 0184 | 0246 | 002634 |
| 34 | 692 | 363 | 0197 | 0263 | 002535 |
| 37 | 791 | 414 | 0213 | 0284 | 002446 |
| 41 | 890 | 465 | 0229 | 0304 | 001912 |
| 45 | 986 | 515 | 0244 | 0326 | 001925 |
| 48 | 908 | 478 | 0214 | 0286 | 002222 |
| 50 | 811 | 431 | 0195 | 0261 | 002321 |
| 49 | 706 | 378 | 019 | 0254 | 004737 |
| 46 | 613 | 329 | 0174 | 0232 | 004016 |
| 42 | 515 | 279 | 0169 | 0225 | 005253 |
| 39 | 420 | 230 | 0149 | 0199 | 004729 |
| 35 | 322 | 178 | 0127 | 017 | 010248 |
| 29 | 222 | 125 | 0132 | 0176 | 012833 |
| 24 | 89 | 56 | 0119 | 0159 | 031753 |

Figure 6:
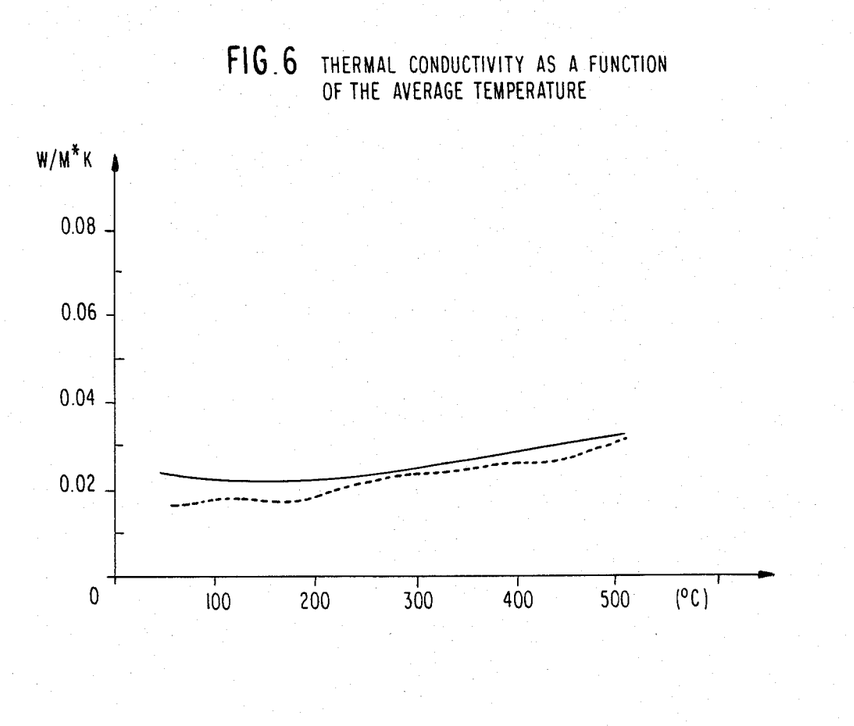

FIG. 6 shows the graphic representation of these values.
Thermal conductivity in range 20°–1000° C. of comparison
Example A
(sprayed with 5 g 25% Ammonia solution).

| Outer Temp. °C. | Inner Temp. °C. | Average °C. | W/K | W/M*K | HHMMSS |
|---|---|---|---|---|---|
| 23 | 78 | 50 | 0185 | 0247 | 004211 |
| 22 | 207 | 115 | 017 | 0226 | 003056 |
| 24 | 305 | 164 | 0168 | 0224 | 002335 |
| 26 | 400 | 213 | 0173 | 023 | 002706 |
| 28 | 498 | 263 | 0176 | 0235 | 002033 |
| 30 | 594 | 312 | 0187 | 0249 | 002526 |
| 32 | 694 | 363 | 0198 | 0264 | 001932 |
| 35 | 790 | 412 | 0207 | 0276 | 001908 |
| 39 | 885 | 462 | 0219 | 0292 | 002452 |
| 43 | 981 | 512 | 0234 | 0312 | 002520 |
| 47 | 907 | 477 | 0208 | 0278 | 002644 |
| 49 | 813 | 431 | 0193 | 0257 | 002327 |
| 49 | 714 | 382 | 0176 | 0235 | 002810 |
| 46 | 612 | 329 | 0173 | 023 | 004730 |
| 42 | 516 | 279 | 0161 | 0214 | 004625 |
| 38 | 418 | 228 | 0153 | 0205 | 005342 |
| 35 | 321 | 178 | 0146 | 0195 | 010042 |
| 30 | 224 | 127 | 0137 | 0183 | 012257 |
| 23 | 89 | 56 | 0133 | 0178 | 032643 |

Figure 7:
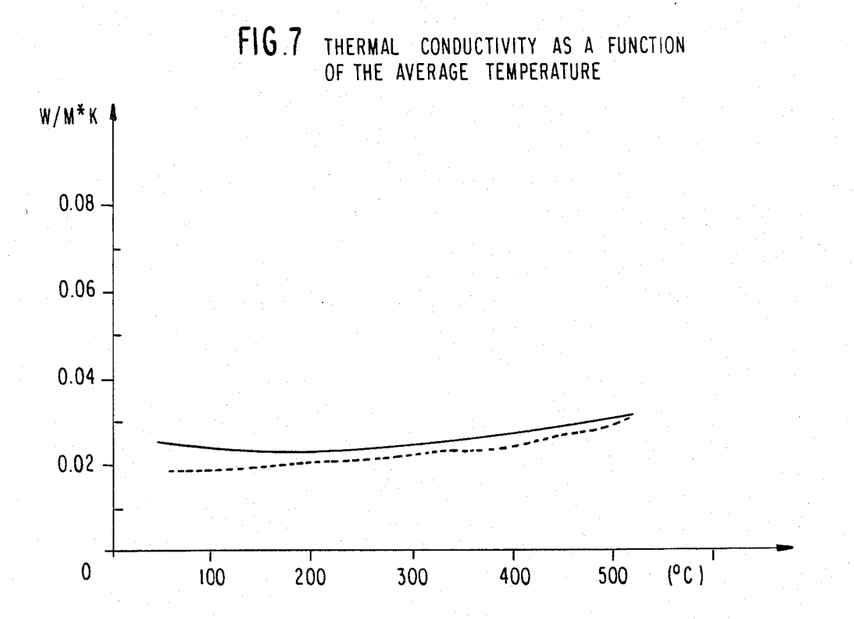

FIG. 7 shows the graphic representation of these values.

COMPARISON EXAMPLE B 300 g of a mixture of heat-insulating material according to Comparison Example A is prepared. The mixture is press-molded under constant pressures but with different molding times to sheets of 300 g/L and the expansion of the sheets after the molding process is measured.

The expansion of the sheets is stabilized if the molding process is maintained for at least 4 to 5 minutes at constant pressure. A further change in the molding time does not produce any further improvement in the expansion behavior. After the molding process, the expansion of the sheets as a function of time again increases by 3% on average, measured after 1 hour. To make sure that the expansion process of the sheets completed, the final measurement was carried out after 12 hours.

EXAMPLE 7

300 g of a mixture of heat-insulating material according to Comparison Example A is prepared and is additionally sprayed with 15 g of 25% aqueous ammonia solution during the mixing process. The mixture is press-molded at constant pressure but with different molding times to sheets corresponding to Comparison B and the expansion of the sheets after the molding process is measured. The expansion of the sheets stabilizes, as in Comparison Example B, if the molding process is maintained for at least 4 to 5 minutes at constant pressure. However, the expansion is only 1.5%, as compared with 9.5% for the untreated mixture of heat-insulating material described in Comparison Example B. The expansion of the sheets appears immediately after the molding process and no longer changes as a function of the time. This means that the favorable expansion value in the NH$_3$ treatment is already achieved after significantly shorter molding times.

The measured results are shown in Table 3 and the expansion of the sheets as a function of the molding time for Comparison Example B and Example 7 is shown in Diagram 1.

TABLE 3

Expansion of the heat insulation sheets as dependent on pressing time

| Example | Treatment | Solution NH$_3$ % ig | Pressure bar/cm$^2$ | Time min | Expansion % | Flexural N | Standard |
|---|---|---|---|---|---|---|---|
| 63% A 300 30% Rutile 7% Kaowool B | No treatment | — | 14.5 | 0 | 16.0 | 116.9 | 131.7 ± 12.6 |
| | | | 14.5 | 2 | 12.0 | 121.6 | |
| | | | 14.5 | 4 | 10.0 | 144.1 | |
| | | | 14.5 | 6 | 9.5 | 144.3 | |
| | | | 14.5 | 8 | 9.5 | 131.6 | |
| | | | 14.5 | 10 | 9.5 | | |
| 63% A 300 30% Rutile 7% Kaowool 7 | sprayed with 15% aq. Ammonia | 25 | 11 | 0 | 7.0 | 193.7 | 181.7 ± 14.0 |
| | | | 11 | 2 | 3.0 | 192.2 | |
| | | | 11 | 4 | 1.5 | 176.3 | |
| | | | 11 | 6 | 1.5 | 186.6 | |
| | | | 11 | 8 | 1.5 | 159.7 | |

COMPARISON EXAMPLE C

A homogenous mixture is produced in a high-speed mixer (approximately 5000 rpm) from 63 wgt % of a pyrogenic silica with a BET surface ares of 380 m$^2$/g, 30 wgt % of a finely divided opacifier (rutile), and 7 wgt % of a ceramic fiber based on aluminum silicate (60 wgt % Al$_2$O$_3$ component). The mixture is press-molded to sheets at constant pressure but with different molding times and the expansion of the sheets after the molding process is measured. The expansion of the sheets stabilizes if the molding process is maintained for at least 2 minutes at constant pressure. A further change in the molding time does not produce any further improvement in the expansion behavior.

After the molding process, the expansion of the sheets as a function of time again increases by 2.5% on average, measured after 1 hour. The final measurement was carried out after 12 hours, in order to make sure that the expansion process of the sheets have been completed.

EXAMPLE 8

300 g of a mixture of heat-insulating material according to Comparison Example C is prepared and is additionally sprayed with 15 g of 25% aqueous ammonia solution during the mixing process. The mixture is press-molded into sheets at constant pressure but with different molding times and the expansion of the sheets after the molding process is measured. The expansion of the sheets stabilizes if the molding process is maintained for at least 2 minutes at constant pressure. A further change in the molding time does not produce any further improvement in the expansion behavior. However, the expansion is only 1.5%, as compared with 6% for the untreated mixture of heat-insulating material described in Comparison Example C.

The expansion of the sheets starts immediately after the molding process and no longer changes as a function of the time.

Figure 8:
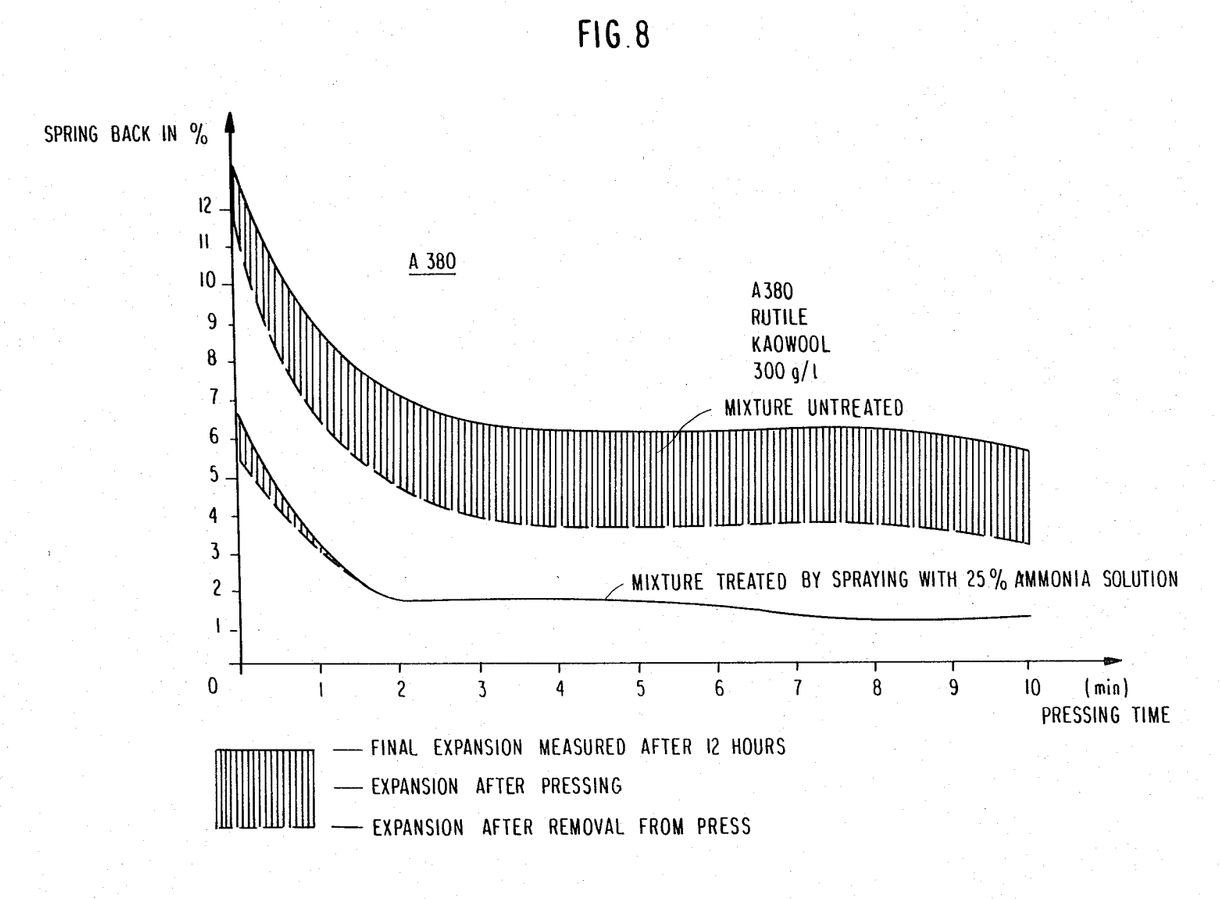
Figure 9:
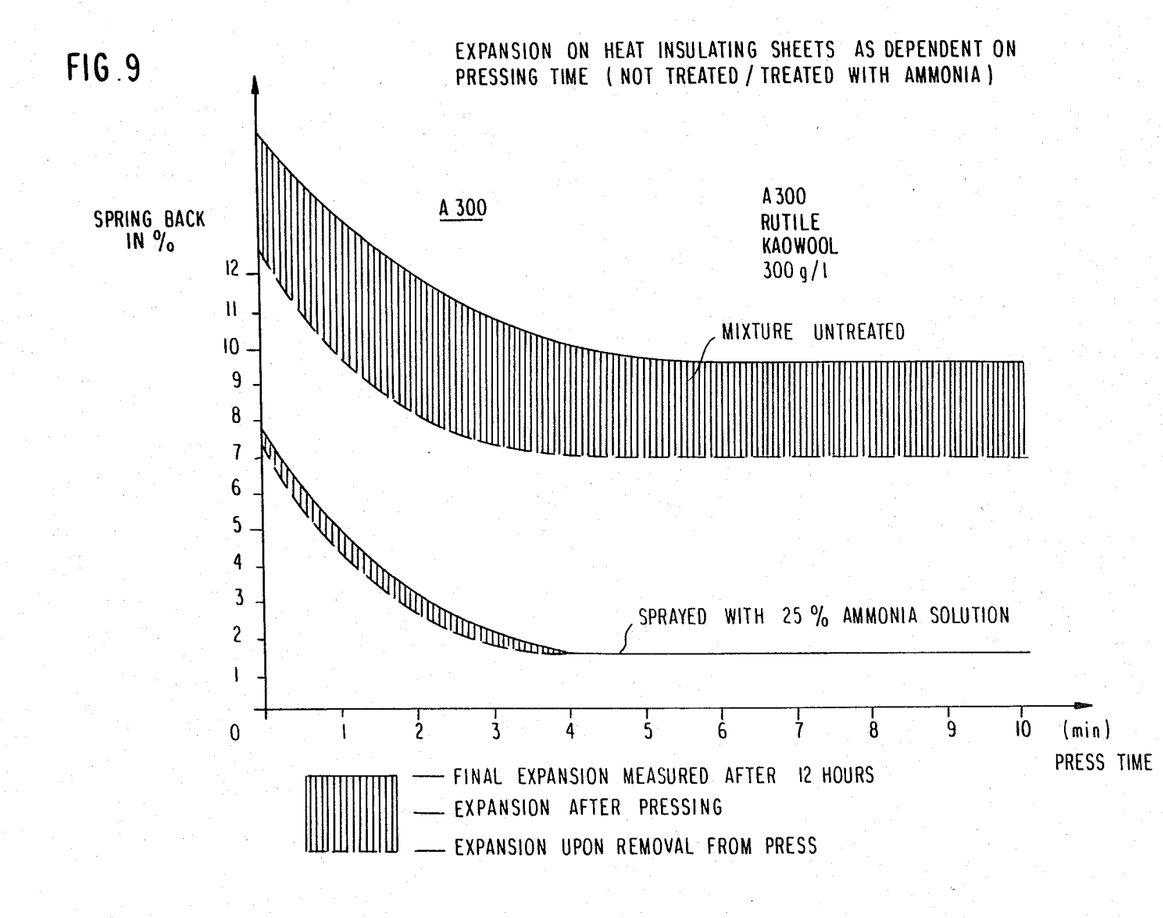

The measured results are shown in Table 4 and the expansion of the sheets as a function of the molding time for Comparison Example C and Example 8 is shown in FIGS. 8 and 9.

TABLE 4

Expansion of heat insulating sheets as dependent on pressing time

| Example | Treatment | Solution NH$_3$ % ig | Pressure bar/cm$^2$ | Time min | Expansion % | Flexural N | Standard |
|---|---|---|---|---|---|---|---|
| 63% A 380 30% Rutile 7% Kaowool C | no treatment | — | 13.5 | 0 | 13.5 | 119.1 | 122.3 ± |
| | | | 13.5 | 2 | 7.0 | 128.7 | 6.8 |
| | | | 13.5 | 4 | 6.0 | 124.3 | |
| | | | 13.5 | 6 | 6.0 | 112.1 | |
| | | | 13.5 | 8 | 6.0 | 127.5 | |
| | | | 13.5 | 10 | 5.5 | | |
| 63% A 380 30% Rutile 7% Kaowool (300 g) 8 | sprayed with 15 g aq. Ammonia | 25 | 11 | 0 | 6.5 | 166.8 | 184.3 ± 15.3 |
| | | | 11 | 2 | 1.5 | 190.8 | |
| | | | 11 | 4 | 1.5 | 177.0 | |
| | | | 11 | 6 | 1.5 | 206.9 | |
| | | | 11 | 8 | 1.0 | 180.0 | |

COMPARISON EXAMPLE D

A mixture of heat-insulating material according to Example C is prepared. The mixture is press-molded to sheets at constant pressure and with a constant molding time of 10 minutes and is used as a comparison for Example 9.

EXAMPLE 9

300 g of a mixture of heat-insulating material according to Comparison Example D is additionally sprayed with 15 g of 25% aqueous ammonia solution during the mixing process and is then press-molded to sheets at constant pressure and with a constant molding time of 10 minutes. The expansion of the sheets after the molding process was significantly reduced, with a simultaneous improvement in the flexural strength and retention of the insulating action and thermal stability.

The measured results of Comparison Example D and of Example 9 are shown in Table 5.

TABLE 5

| Example | Treatment | Solution % ig NH$_3$ | Pressure bar/cm$^2$ | Modulus of Rapture N | | Expansion % | Shrinkage % | | |
|---|---|---|---|---|---|---|---|---|---|
| 63% A 380 30% Rutile 7% Kaowool D | No treatment | — | 13.5 | 140.2 | 136.9 ± 6.3 | 6.5 | 4.3 | 11.5 | 19.3 |
| | | | 13.5 | 135.5 | | 6.5 | | | |
| | | | 13.5 | 128.7 | | 6.5 | | | |
| | | | 13.5 | 145.5 | | 6.5 | | | |
| | | | 13.5 | 134.5 | | 6.5 | | | |
| 63% A 380 30% Rutile 7% Kaowool 9 | Sprayed with 15 g aq. Ammonia | 25 | 11 | 171.7 | 180.4 ± 12.3 | 1.5 | 4.4 | 8.5 | 16.3 |
| | | | 11 | 181.9 | | 1.0 | | | |
| | | | 11 | 183.9 | | 1.0 | | | |
| | | | 11 | 165.8 | | 1.0 | | | |
| | | | 11 | 197.8 | | 1.5 | | | |

COMPARISON EXAMPLE E

A homogenous mixture is prepared in a high-speed mixer (approximately 5000 rpm) from 53 wgt % of a pyrogenic silica with a BET surface area of 300 m²/g, 40 wgt % of a finely divided opacifier (quartz), and 7 wgt % of a ceramic fiber based on aluminum silicate (60 wgt % $Al_2O_3$ component). The mixture is press-molded to sheets with a liter weight of 300 g/L.

EXAMPLE 10

300 g of a mixture of heat-insulating material according to Comparison Example E is additionally sprayed with 40 g of 8% aqueous urea solution during the mixing process. The preparation, composition, and further processing of the mixture of heat-insulating material is carried out as described in Comparison Example E. The sheets are then annealed at 120° C. for two hours. The flexural strength of the sheets is improved by 75% as compared with Comparison Example E (see Table 6).

EXAMPLE 11

300 g of a mixture of heat-insulating material is additionally sprayed with 35 g of 12% aqueous ammonia solution during the mixing process and is then annealed at 120° C. for two hours in a closed space. The preparation, composition, and further processing of the mixture of heat-insulating material is carried out in accordance with Comparison Example E.

The flexural strength of the sheets is improved by approximately 90% (see Table 6).

EXAMPLE 12

300 g of a mixture of heat-insulating material is additionally sprayed with 40 g of 7% ammonia-stabilized silica sol during the mixing process. The preparation, composition, and further processing of the mixture of heat-insulating material is carried out according to Comparison Example E. The sheets are then annealed at 120° C. for two hours. The flexural strength of the sheets is approved by approximately 55% as compared with Comparison Example E (see Table 6).

TABLE 6

| Example | Treating | Solution % ig NH₃ | Pressure bar/cm² | Flexural N | Shrinkage % | | |
|---|---|---|---|---|---|---|---|
| 53% A 300 40% Quarz-(meal) 7% Kaowool E | no treatment | — | 11 | 63 | 2.0 | 5.0 | 9.0 |
| | | | 11 | 80 | 2.3 | 6.0 | 10.0 |
| | | | 11 | 76 | 2.5 | 6.5 | 11.0 |
| | | | 11 | 84 | 3.0 | 6.5 | 11.5 |
| | | | 11 | 80 | 2.0 | 5.0 | 9.0 |
| | | | 11 | 82 | 3.5 | 6.5 | 12.0 |
| | | | 11 | 87 | 2.5 | 7.0 | 11.5 |
| | | | 11 | 65 | | | |
| | | | 11 | 84 | | | |
| | | | 11 | 70 | | | |
| 53% A 300 40% Quarz-meal 7% Kaowool 10 | sprayed with 40 g 8% urea solution | 8 | 8.5 | 140 | — | — | — |
| 53% A 300 40% Quarz-meal 7% Kaowool 11 | sprayed with 35 g aq. Ammonia | 12 | 8.5 | 173 | 2.0 | 3.0 | 6.5 |
| | | | 8.5 | 160 | 2.0 | 4.0 | 8.0 |
| | | | 8.5 | 125 | 2.0 | 3.0 | 6.5 |
| | | | 8.5 | 156 | | | |
| 53% A 300 40% Quarz-meal 7% Kaowool (300 g) 12 | sprayed with 40 g Ammonia stabilized silica solution | 7 | 8.5 | 131 | 2 | 3.5 | 7.0 |
| | | | 8.5 | 131 | 2 | 4.5 | 8.0 |
| | | | 8.5 | 124 | | | |
| | | | 8.5 | 125 | | | |

EXAMPLE 13

An insulating material is prepared as described in German OLS No. 2,942,087. For the preparation of the press-molded heat-insulating part, the premix, consisting of the binder and the dispersing agent, is first prepared. The mixture consists of 10% hydrophobized silica and 90% sodium carbonate. The mixture is ground to a particle size below one micron in a ball mill. The mixture of insulating material, consisting of 53 wgt % pyrogenic silica with a BET surface area of 300 m²/g, 30 wgt % of a finely divided opacifier (rutile), 5 wgt % of a ceramic fiber based on aluminum silicate (60 wgt % of $Al_2O_3$ component), and 10 wgt % of binder mixture is then prepared. The mixture is press-molded to sheets with a liter weight of 300 g/L. The press-molded heat-insulating parts are cured at a temperature of 600° C., with a residence time of 20 minutes. The compressive strength was improved, but the flexural strength was not. The temperature stability is reduced from 950° C. to 600° C. The good insulating action of the mixture of insulating material is lost at application temperatures of 600° C., because the specimen is destroyed.

Thermal conductivity in range of 20–1000° C. of 55% A 300 30% Rutile, 5% Kaowool, 10% Soda/R 972
Example 13

| Outer ° C. | Inner ° C. | Average ° C. | W/K | W/M*K | HHMMSS |
|---|---|---|---|---|---|
| 22 | 84 | 53 | 0213 | 0284 | 012345 |
| 23 | 213 | 118 | 0192 | 0256 | 020939 |
| 25 | 308 | 167 | 0189 | 0252 | 024437 |
| 27 | 402 | 215 | 019 | 0254 | 032054 |
| 29 | 495 | 262 | 0193 | 0258 | 035521 |
| 32 | 592 | 312 | 0207 | 0276 | 043300 |
| 34 | 688 | 361 | 0233 | 0311 | 051314 |
| 43 | 784 | 414 | 0328 | 0437 | 063214 |
| 64 | 881 | 473 | 0591 | 0789 | 081254 |
| 67 | 1013 | 540 | 0963 | 1284 | 082329 |
| 83 | 884 | 483 | 0843 | 1124 | 091947 |
| 81 | 785 | 433 | 0777 | 1036 | 101216 |
| 74 | 687 | 381 | 0719 | 0959 | 111933 |
| 68 | 597 | 333 | 0645 | 086 | 120352 |
| 62 | 509 | 285 | 0597 | 0796 | 124646 |
| 56 | 418 | 237 | 0526 | 0702 | 132055 |
| 49 | 324 | 186 | 0461 | 0615 | 120531 |
| 39 | 226 | 133 | 0396 | 0529 | 150727 |
| 29 | 92 | 60 | 0345 | 0461 | 173458 |

Figure 10:
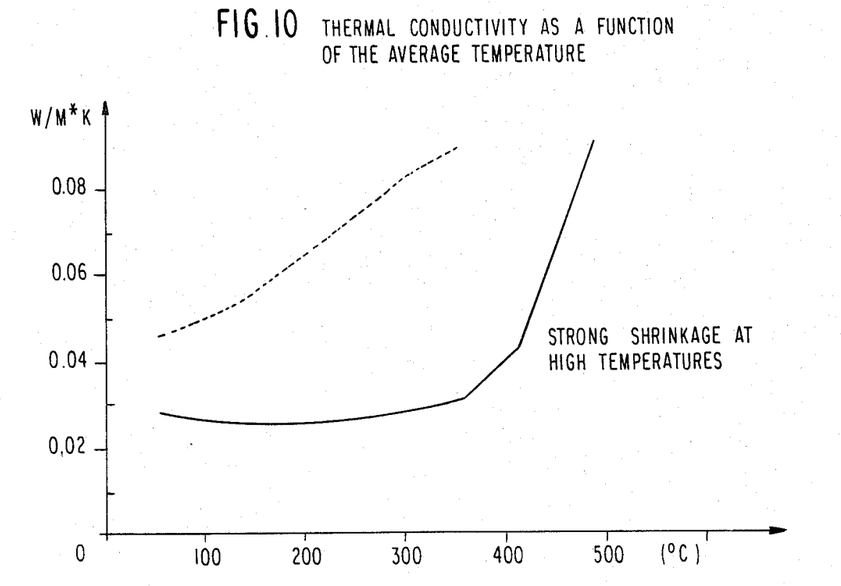

FIG. 10 shows the graphic representation of these values.

EXAMPLE 14

A total of 300 g of a homogenous mixture of heat-insulating material is prepared in a high-speed mixer (approximately 5000 rpm) from 63 wgt % of a pyrogenic silica with a BET surface area of 300 m²/g, 30 wgt % of a finely divided opacifier (rutile), and 7 wgt % of a ceramic fiber based on aluminum silicate (60 wgt % Al₂O₃ component). The mixture of heat-insulating material is then treated with a 25% ammonia/water vapor mixture. The mixture of heat-insulating material is press-molded to sheets with a liter weight of 300 g/L. The expansion of the sheets after the molding process (10 minutes) was significantly reduced, with a simultaneous improvement in the flexural strength, retention of the thermal stability, and insignificant change in the insulating action.

The measured results for Example 14 are shown in Table 7.

TABLE 7

| Example | Treatment | Pressure bar 10 min. | Expansion % | Flexural N | Flexural Standard | Shrinkage (5) 1000° C. |
|---|---|---|---|---|---|---|
| 63% A 300 | 25% aq. Ammonia steam | 11 11 11 | 3 3 3 | 230.0 232.7 226.8 | 235.2 ± 7.6 | 3.2 7.9 14.8 |
| 30% Rutile | | | | | | |
| 7% Kaowool (300 g) | | 11 11 | 3 3 | 242.9 243.4 | | |

Thermal conductivity in the range of 20–1000° C. of the standard mixture steamed with 15 ml Ammonia at 100° C.
Example 14

| Outer ° C. | Inner ° C. | Average ° C. | W/K | W/M*K | HHMMSS |
|---|---|---|---|---|---|
| 21 | 86 | 53 | 0203 | 027 | 012302 |
| 22 | 214 | 118 | 0169 | 0225 | 020418 |
| 25 | 309 | 167 | 0164 | 0219 | 024002 |
| 27 | 403 | 215 | 017 | 0227 | 031750 |
| 30 | 500 | 265 | 0181 | 0241 | 035444 |
| 32 | 597 | 315 | 0189 | 0252 | 042537 |
| 37 | 693 | 365 | 0198 | 0265 | 050107 |
| 41 | 789 | 415 | 0211 | 0282 | 053632 |
| 46 | 886 | 466 | 0227 | 0303 | 061145 |
| 51 | 984 | 518 | 0246 | 0328 | 064656 |
| 56 | 901 | 479 | 0223 | 0298 | 072932 |
| 56 | 805 | 431 | 0196 | 0261 | 080138 |
| 53 | 705 | 379 | 0179 | 0239 | 084226 |
| 46 | 605 | 326 | 0174 | 0232 | 093723 |
| 41 | 513 | 277 | 0155 | 0206 | 102849 |
| 36 | 414 | 225 | 0148 | 0197 | 113534 |
| 31 | 319 | 175 | 0144 | 0192 | 125456 |
| 27 | 221 | 124 | 0133 | 0178 | 142939 |
| 20 | 87 | 53 | 0137 | 0182 | 182121 |

Figure 11:
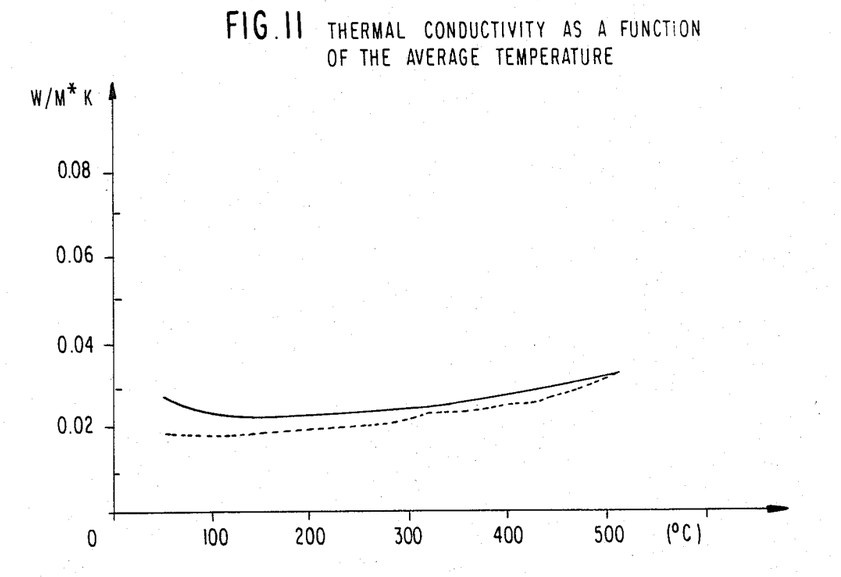

The graphic representation of these values is shown in FIG. 11.

Figure 12:
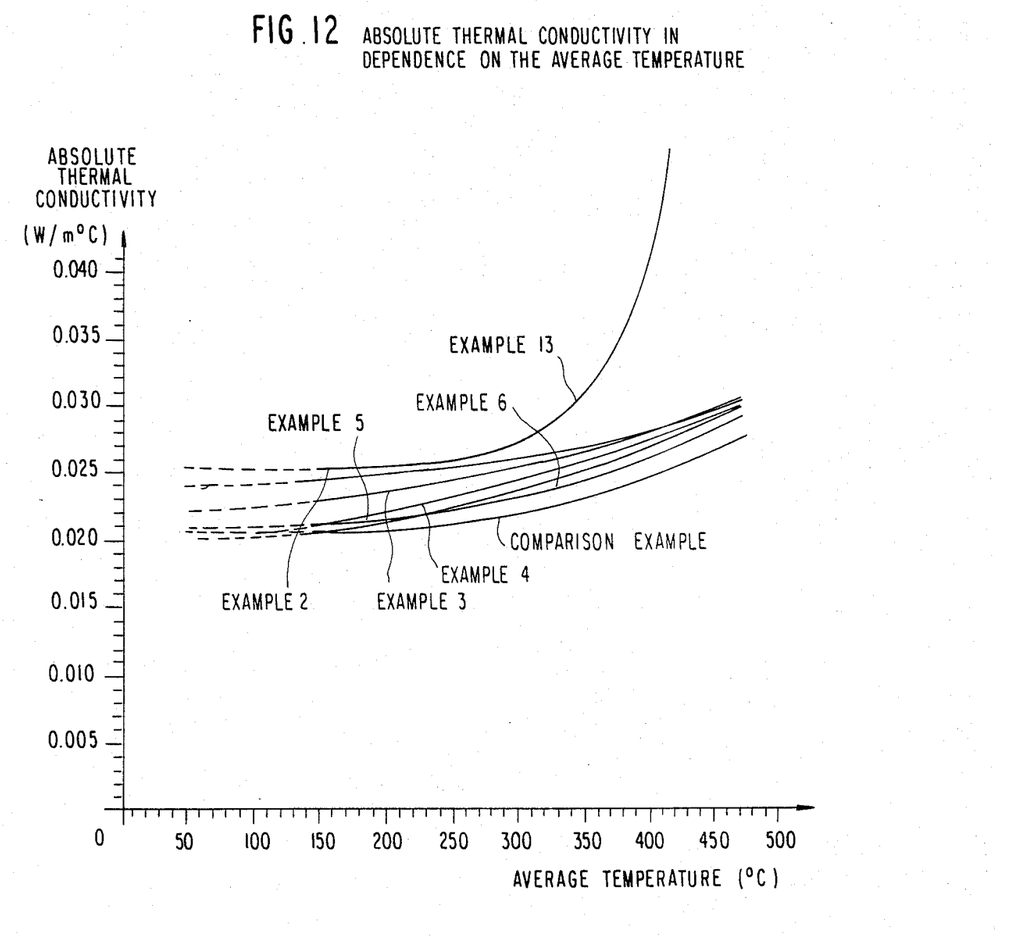

The arithmetically determined thermal conductivities are shown as a function of the average temperatures for the different heat-insulating systems in FIG. 12.

The average temperature is calculated by means of the equation:

$$\frac{\text{Internal temperature} + \text{External temperature}}{2}$$

The names mentioned in the examples have the following meanings:
1. Aerosil 300 is a pyrogenically prepared silica with a BET surface area of 300 m²/g
2. Aerosil 380 is a pyrogenically prepared silica with a BET surface area of 380 m²/g
3. Kaowool is a ceramic aluminum silicate fiber containing 60 wgt % Al₂O₃ and 40 wgt % SiO₂.

We claim:

1. Process for the production of binder-free press-molded heat-insulating article comprising mixing at least one highly dispersed oxide of a metal and/or metalloid, at least one opacifier, and at least one inorganic fiber as a heat-insulating material, in the presence of a nitrogen-containing substance which is basic in aqueous solution to form a mixture of heat-insulating material and press-molding the mixture to the desired shaped article.

2. Process according to claim 1, further comprising the nitrogen-containing substance is in the form of an aqueous solution.

3. Process according to claim 1, further comprising the nitrogen-containing substance is used in the gaseous state in the presence of water vapro.

4. Process for the production of a binder-free press-molded heat-insulating shaped article comprising selecting at least one highly dispersed oxide of a metal and/or a metalloid, at least one opacifier, and at least one inorganic fibrous material which is a heat-insulating material, forming a mixture thereof, contacting said mixture with an aqueous solution of a substance exhibiting a basic reaction in aqueous solution, and then press-molding the mixture so treated into the desired shaped article.

5. Process according to claim 4, further comprising drying said shaped article after press-molding.

6. Process according to claim 4, further comprising forming a mixture containing approximately 40 to 70% of said highly dispersed metal or metalloid oxide, 20 to 50% of opacifier, 1 to 10% of inorganic fiber.

7. Process according to claim 6, further comprising 40 to 70% pyrogenically produced silica, or mixture of said silica and aluminum oxide or titanium oxide, or zirconium oxide or alkali-free precipitated silica; 20 to 50% quartz powder, rutile or ilmenite as opacifier; 1 to 10% of aluminum silicate refractory fiber.

8. Process according to claim 6, further comprising wherein said aqueous solution containing the nitrogen compound is used in the amount of 3 to 7% weight percent.

9. A product produced by the process of claim 1.

10. A product produced by the process of claim 4.

* * * * *